(12) United States Patent
Shokouhi et al.

(10) Patent No.: US 9,064,016 B2
(45) Date of Patent: Jun. 23, 2015

(54) RANKING SEARCH RESULTS USING RESULT REPETITION

(75) Inventors: Milad Shokouhi, Cambridge (GB); Ryen William White, Woodinville, WA (US); Paul Nathan Bennett, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/420,591

(22) Filed: Mar. 14, 2012

(65) Prior Publication Data

US 2013/0246412 A1    Sep. 19, 2013

(51) Int. Cl.
*G06F 17/30* (2006.01)

(52) U.S. Cl.
CPC .................. *G06F 17/30867* (2013.01)

(58) Field of Classification Search
CPC ............ G06F 17/30646; G06F 17/30648; G06F 17/30699; G06F 17/3053; G06F 17/30554; G06F 17/30705
USPC .......................................... 707/723
See application file for complete search history.

(56) References Cited

U.S. PATENT DOCUMENTS

| | | | |
|---|---|---|---|
| 7,702,671 B2 * | 4/2010 | Jacobs et al. | 707/705 |
| 7,934,161 B1 * | 4/2011 | Denise | 715/738 |
| 8,065,286 B2 * | 11/2011 | Jones | 707/706 |
| 8,086,620 B2 | 12/2011 | Parikh et al. | |
| 8,515,950 B2 * | 8/2013 | Gao et al. | 707/723 |
| 2009/0164929 A1 | 6/2009 | Chen et al. | |
| 2009/0248661 A1 | 10/2009 | Bilenko et al. | |
| 2010/0125570 A1 | 5/2010 | Chapelle et al. | |
| 2010/0318531 A1 | 12/2010 | Gao et al. | |
| 2011/0029517 A1 * | 2/2011 | Ji et al. | 707/734 |
| 2011/0208730 A1 | 8/2011 | Jiang et al. | |
| 2011/0231390 A1 | 9/2011 | Inagaki et al. | |
| 2012/0130969 A1 * | 5/2012 | Wong et al. | 707/706 |

OTHER PUBLICATIONS

Adar, et al., "Large scale analysis of web revisitation patterns", In Proc. SIGCHI, pp. 1197-1206, 2008.
Agichtein, et al., "Improving web search ranking by incorporating user behavior information", In Proc. SIGIR, pp. 19-26, 2006.
Agichtein, et al., "Learning user interaction models for predicting web search result preferences", In Proc. SIGIR, 2006.

(Continued)

*Primary Examiner* — Debbie Le
(74) *Attorney, Agent, or Firm* — Steve Wight; Judy Yee; Micky Minhas (57) ABSTRACT

Ranking search results using result repetition is described. In an embodiment, a set of results generated by a search engine is ranked or re-ranked based on whether any of the results were included in previous sets of results generated in response to earlier queries by the same user in one or more searching sessions. User behavior data, such as whether a user clicks on a result, skips a result or misses a result, is stored in real-time and the stored data is used in performing the ranking. In various examples, the ranking is performed using a machine-learning algorithm and various parameters, such as whether a result in a current set of results has previously been clicked, skipped or missed in the same session, are generated based on the user behavior data for the current session and input to the machine-learning algorithm.

18 Claims, 6 Drawing Sheets

(56) References Cited

OTHER PUBLICATIONS

Cao, et al., "Context-aware query suggestion by mining clickthrough and session data", In Proc. SIGKDD, pp. 875-883, 2008.
Chapelle, et al., "A Dynamic Bayesian Network Click Model for Web Search Ranking", In Proceedings of the 18th International Conference on World Wide Web, Apr. 20-24, 2009, pp. 1-10.
Cockburn, et al., "Improving web page revisitation: Analysis, design and evaluation", IT & Society, 1(3):159-183, 2003.
Craswell, et al., "An experimental comparison of click position-bias models", In Proc. WSDM, pp. 87-94, 2008.
Daoud, et al., "A session based personalized search using an ontological user profile", In Proc. SOC, 2009.
Dumais, et al., "Stuff I've seen: a system for personal information retrieval and re-use", In SIGIR, pp. 72-79, 2003.
Dupret, et al., "A model to estimate intrinsic document relevance from the clickthrough logs of a web search engine", In Proc. WSDM, pp. 181-190, 2010.
Dupret, et al., "A user browsing model to predict search engine click data from past observations", In Proc. SIGIR, pp. 331-338, 2008.
Guo, et al., "Click chain model in web search", In Proc. WWW, pp. 11-20, 2009.
Guo, et al., "Efficient multiple-click models in web search", In Proc. WSDM, pp. 124-131, 2009.
Joachims, et al., "Optimizing search engines using clickthrough data", In Proc. SIGKDD, pp. 132-142, 2002.
Joachims, et al., "Evaluating the accuracy of implicit feedback from clicks and query reformulations in web search", ACM TOIS, 25(2), 2007.
Matthijs, et al., "Personalizing web search using long term browsing history", In Proc. WSDM, pp. 25-34, 2011.
Obendorf, et al., "Web page revisitation revisited: Implications of a long-term click-stream study of browser usage", In Proc. SIGCHI, pp. 597-606, 2007.
Radlinski, et al., "Query chains: Learning to rank from implicit feedback", In Proc. SIGKDD, pp. 239-248, 2005.
Radlinski, et al., "How does clickthrough data reflect retrieval quality?", In Proc. CIKM, pp. 43-52, 2008.
Sanderson, et al., "Examining repetition in user search behavior", In Proc. ECIR, 2007.
Shen, et al., "Context-sensitive information retrieval using implicit feedback". In Proc. SIGIR, pp. 43-50, 2005.
Sontag, et al., "Probabilistic models for personalizing web search", In Proc. WSDM, 2011.
Tan, et al., "Mining long-term search history to improve search accuracy", In Proc. SIGKDD, pp. 718-723, 2006.
Tauscher, et al., "How people revisit web pages: Empirical findings and implications for the design of history systems", International Journal of Human-Computer Studies, 47(1): 97-137, 1997.
Teevan, et al., "Information re-retrieval: Repeat queries in yahoo's logs", In Proc. SIGIR, pp. 151-158, 2007.
Teevan, et al., "The perfect search engine is not enough: A study of orienteering behavior in directed search", In Proc. SIGCHI, pp. 415-422, 2004.
Teevan, et al., "Personalizing search via automated analysis of interest and activities", In Proc. SIGIR, pp. 449-456, 2005.
Teevan, et al., "Understanding and predicting personal navigation", In Proc. WSDM, 2011.
Tyler, et al., "Large scale query log analysis of re-finding", In Proc. WSDM, 2010.
Wang, et al., "Inferring search behaviors using partially observable markov (pom) model", In Proc. WSDM, pp. 211-220, 2010.
Wang, et al., "Pskip: estimating relevance ranking quality from web search clickthrough data", In Proc. SIGKDD, pp. 1355-1364, 2009.
White, et al., "Predicting user interests from contextual information", In Proc. SIGIR, pp. 363-370, 2009.
White, et al., "Predicting short-term interests using activity-based search context", In Proc. CIKM, pp. 1009-1018, 2010.
Wu, et al., "Adapting boosting for information retrieval measures", Journal of Information Retrieval, 13:254-270, 2009.
Xiang, et al., "Context-aware ranking in web search", In Proc. SIGIR, pp. 451-458, 2010.
Zhang, et al., "User-click modeling for understanding and predicting search-behavior", In Proc. SIGKDD, pp. 1388-1396, 2011.

\* cited by examiner

RANKING SEARCH RESULTS USING RESULT REPETITION

BACKGROUND

Information retrieval systems are widely used by users to search for information on a given subject. Web-based search systems are an example of one type of information retrieval system. Users submit a query to the web-based search system and obtain a list of results comprising links to documents that are relevant to the entered query. The list of results returned may be ranked by the search system such that results which are considered more relevant to the entered query are presented towards the top of the list and results which are less relevant are presented lower down on the list of results. Machine learning algorithms may be used to perform the ranking of results, where the algorithms are trained offline using labeled data. These labels are typically generated by human reviewers who make an assessment of the relevance of a particular label to a particular query.

The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Ranking search results using result repetition is described. In an embodiment, a set of results generated by a search engine is ranked or re-ranked based on whether any of the results were included in previous sets of results generated in response to earlier queries by the same user in one or more searching sessions. User behavior data, such as whether a user clicks on a result, skips a result or misses a result, is stored in real-time and the stored data is used in performing the ranking. In various examples, the ranking is performed using a machine-learning algorithm and various parameters, such as whether a result in a current set of results has previously been clicked, skipped or missed in the same session, are generated based on the user behavior data for the current session and input to the machine-learning algorithm.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
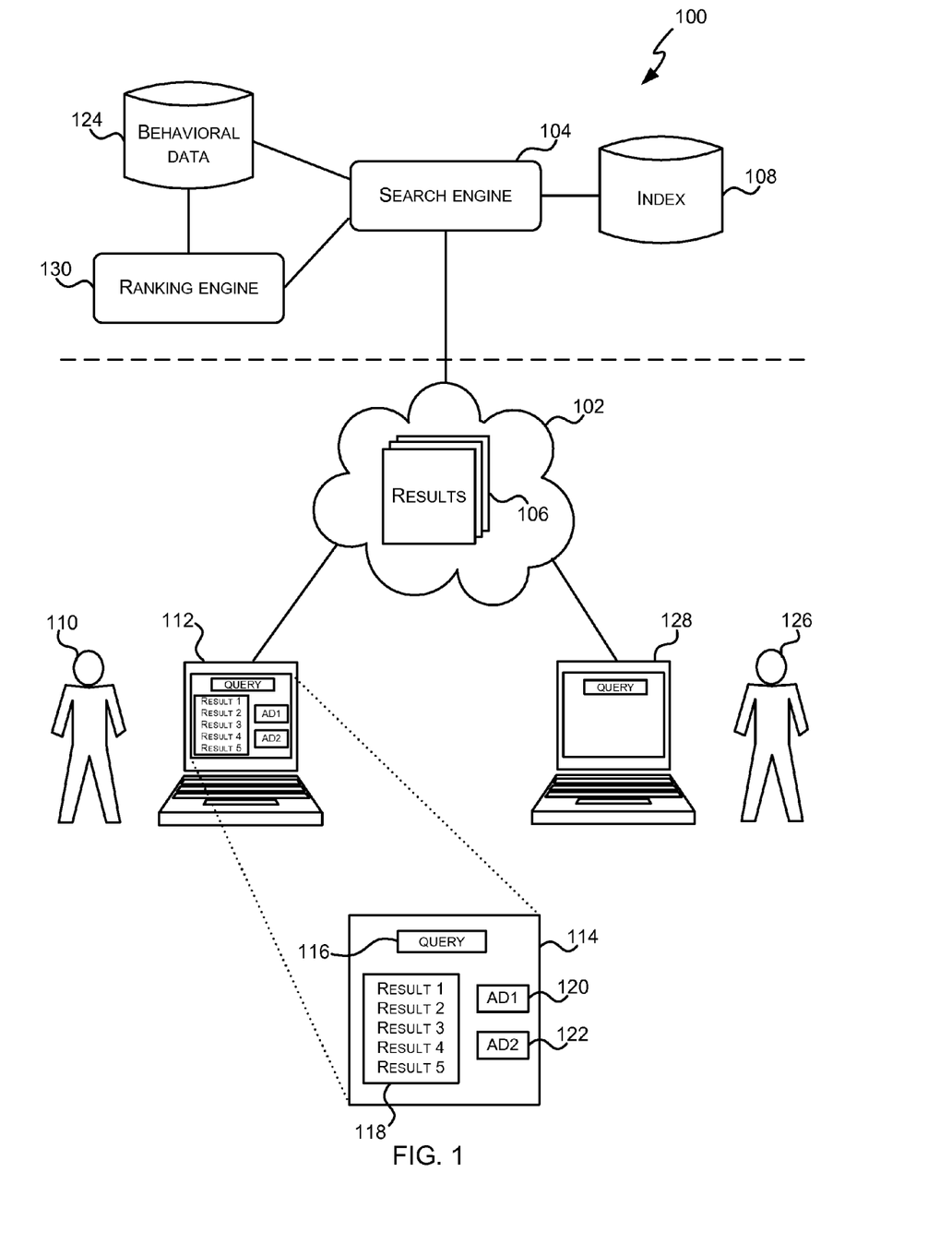
FIG. 1 is a schematic diagram of an example information retrieval system.

FIG. 1 is a schematic diagram of an example information retrieval (IR) system 100 which is accessed using a communications network 102. In an example, the information retrieval system 100 comprises a search engine 104 which is arranged to retrieve a set (or list) of results 106 which can be stored at, or are accessible via, the communications network 102. The search engine 104 is arranged to access an index 108 or other database in order to form the set (or list) of results.

The term 'result' (or 'search result') is used herein to refer to any item of information which may be retrieved using a query server or search engine and the term is used to refer to the item of information itself or to a link to the item of information. A non-exhaustive list of example items of information which may be retrieved includes: documents, photographs, digital images, files, email messages, voice mail messages, short message service messages, text-based posts at a social networking service, web pages, part of a web page, maps, electronic ink, commercial products, videos, multimedia files, songs, albums, news articles, database records or a part or summary of one or more of these items. Where the results comprise links to items of information, these links may be in the form of URLs (uniform resource locators); however, the methods described below are not limited to implementations which use URLs and lists of results may identify or link to items of information by any means (e.g. filename, file path, file storage location). In the following description, any use of a URL as a means of linking to (or identifying) a particular item of information is by way of example only and other forms of identifiers or references may alternatively be used.

In the example described herein, the communications network 102 is the Internet, and the results 106 are web pages. In other examples, the communications network 102 can be any appropriate network. A non exhaustive list of examples of appropriate networks includes: Local Area Networks (LAN), Wide Area Networks (WAN), Public Switched Telephone Networks (PSTN), and Virtual Private Networks (VPN). The communications network 102 can be a wireless network or a wired network or combinations thereof. In the examples described herein the search engine 104 is a web search engine. However, in other examples the search engine 104 may be a desktop search engine, media search engine or other appropriate search engine.

Using the communications network 102 a user 110 is able to access the search engine 104, for example, using a web browser or other suitable access interface executed on a computing device 112. The search engine 104 is of any suitable type arranged to identify documents using the index 108 on the basis of the relevance of those documents to search terms input by the user 110. Those user input search terms are referred to as a query. For example, the search engine 104 is arranged to analyze user search terms and generate a rank or weighting for documents 106 on the basis of user input search terms. The search engine 104 may then provide an ordered list of the documents (or links to the documents) based on the ranking.

In an example, the user 110 using the computing device 112 can use a graphical user interface (GUI) 114 to submit a query 116 to the information retrieval system 100 in order to find relevant search results. Responsive to this, the information retrieval system 100 provides a ranked list 118 of search results, which is displayed in the user interface 114. Optionally, the information retrieval system 100 may also provide one or more relevant advertisements, such as AD1 120 and AD2 122 shown the user interface 114. The full page that is returned (including any advertisements 120, 122) may be referred to as a 'search engine results page' (SERP).

The user 110 viewing the ranked list 118 in the user interface 114 can select a result from the ranked list 118, and can view the item of information associated with that result. The result can be selected by the user by, for example, the user 110 using a pointing device (such as a mouse or track-pad) to actively "click" on the result. In other examples, instead of active "clicks", selection may result from a user moving a mouse, a finger, their gaze, or other user interface device over a result for at least a specified time, or performing another specified action. The user input which results from a user selecting an item from the ranked list 118 may be referred to a 'SERP click'.

When a result is selected by the user 110, the selection is recorded by the search engine 104 in a behavioral data store 124. The behavioral data store 124 stores data relating to the selection, including the query and the location of the clicked result in the ranked list and this stored data may relate to only the current session and/or to one or more previous searching sessions of the user (as described in more detail below with reference to FIGS. 3 and 4). Therefore, in this example, the behavioral data store 124 stores click history data (although, in other examples, different types of behavioral data can be stored). User behavior and click data contains much information about the utility of results. The term 'click data' is used herein to refer to data on whether a user selected ("clicked") to view an item in a list of search results. In some examples, the click data further comprises the position of the result within the list of results at which it was clicked (e.g. in case the same result is included more than once within the same set of results). The information retrieval system 100 further comprises a ranking engine 130 which uses the behavioral data (and in some examples other data) to rank the set (or list) of documents 106 (generated by search engine 104) before the list is presented to the user (as ranked list 118). More detail on the behavioral data stored and how this is used in ranking is provided below. The ranking engine 130 may use a machine learning algorithm which is trained off-line using previous click logs.

The term 'ranking' is used herein with respect to results to refer to the process of assigning a particular position in an order of relevance (or anticipated relevance) to each result. This term includes both performing an initial ranking of unranked results and re-ranking results which have already been ranked.

In the example of FIG. 1, a further user 126 operating a further computing device 128 can also access the information retrieval system 100 via the communication network 102. Note that many more users can also access the information retrieval system 100, but are not illustrated in FIG. 1. The information retrieval system may be accessed by a plurality of users either concurrently or at different times using any appropriate device. The computing devices 112, 128 may comprise any appropriate computer-based device. A non-exhaustive list of suitable devices includes: a desktop computer, a laptop computer, a tablet, a PDA, a telephone device, a hand-held gaming device.

In FIG. 1 (and subsequent FIGS. 3, 5 and 6), the search engine 104 (or search engine logic 612) and ranking engine 130 (or ranking logic 614) are shown as separate functional entities. It will be appreciated, however, that in various examples, the ranking engine 130 may be integrated within the search engine 104.

In FIG. 1 the information retrieval system 100 is shown as being located remotely from the users' computing devices 112, 128 (as accessed via communications network 102). In other examples, however, the entire information retrieval system 100 or parts of the system may be local to a user's computing device 112, 128. For example, parts of the system may run on the user's computing device (e.g. search engine 104 and/or ranking engine 130) and/or data may be stored locally on the user's computing device (such as the behavioral data store 124).

Figure 2:
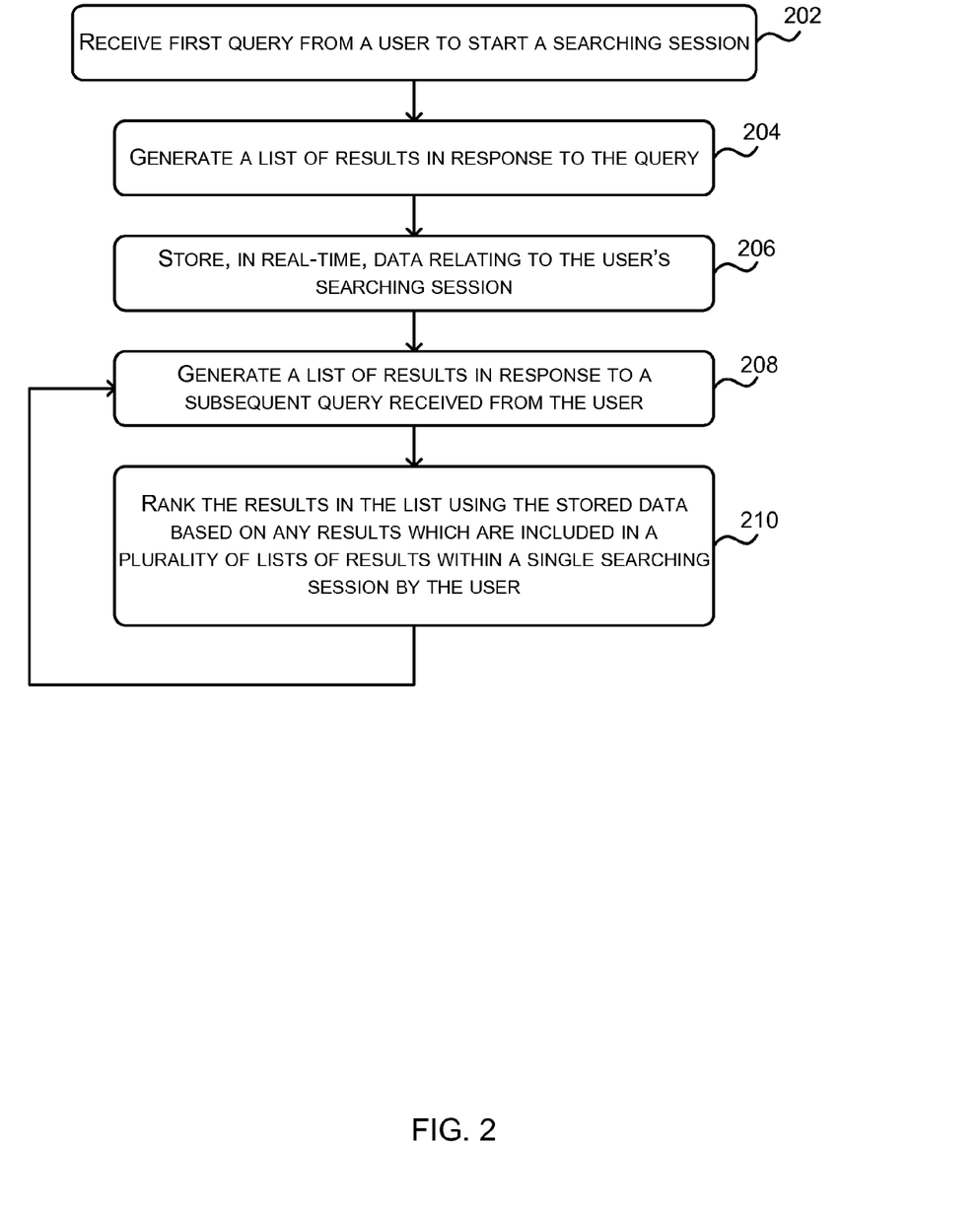
FIG. 2 is a flow diagram of an example method of operation of an information retrieval system, such as those shown in FIGS. 1, 3 and 5.

FIG. 2 is a flow diagram of an example method of operation of an information retrieval system (such as IR system 100 in FIG. 1) which uses additional information to improve the ranking of search results. In particular, this additional information comprises information about when the same result is returned to a user more than once. In some examples, the repetition of results may be within a single searching session by a user and in other examples, longer term information (e.g. repetition of results across multiple sessions for the same user, such as the current session and one or more previous sessions) may be used in addition to or instead of repetition of results within a single searching session (e.g. within the current searching session). The additional information which is used to improve the ranking may comprise other information such as user behavior information, contextual information, user history, etc, and further examples are described below. In some examples, the user behavior with respect to the results which are displayed more than once to the same user is also used (as described in more detail below).

A single searching session may be defined as a sequence of search queries issued by a user without a break which exceeds a specified time threshold, such as 30 minutes. Such a searching session may be described as a continuous searching period even though there may be breaks in the searching which are shorter than (or do not exceed) the specified time threshold. Alternatively, a different definition of a single searching session may be used and other examples involve looking at the overlap between subsequent queries (e.g. once there is no longer any overlap then the particular session is deemed to be over) or considering whether the active task is over (e.g. deeming a session to be over when a user switches to another activity such as visiting their home page or a social networking site or checking their email, etc.). In the following description, any reference to a particular definition of a searching session is used by way of example only.

As shown in FIG. 2, a search session for a user starts when they issue a first query and this is received by the information retrieval system (block 202). In response to this query, the IR system (e.g. search engine 104) generates a list of results in response to the query (block 204) and this list is presented to the user. As the search session (i.e. the current session) continues, data relating to the user's searching is stored in real-time (block 206), e.g. in behavioral data store 124. The term 'real-time' is used herein to mean that the stored data is updated following a user action within the searching session, where the user action may, for example, be a query, click, skip or miss. This data which is stored in real-time may also be referred to as an online data store because the data is updated in real-time and to distinguish it from any analysis of user behavior which may be performed off-line.

When a subsequent query is received from the user, a list of results is generated in response to that query (block 208) and these results are ranked by the ranking engine 130 using the stored data (from block 206) based on any results (i.e. documents) which are included in multiple lists of results within a single search session (block 210).

These results which are included within in two or more lists of results within a single searching session by a single user may be referred to as 'repeating results'. Each list of results which is displayed to the user (within a single session) may be referred to as an 'impression' such that a repeating URL is a URL that is included within multiple impressions. The term 'repeating results' may also be used to refer to results which are included in two or more lists of results within a longer search history of the user and this is described in more detail below with reference to FIGS. 3 and 4.

The steps of the method shown in FIG. 2 are then repeated when a user issues further queries within the same session (blocks 208 and 210 repeated as indicated by the arrow from block 210 to block 208). In addition, the method continues to store real-time data relating to the user's searching session (block 206) and this real-time storing of data may be performed substantially in parallel with the generation of results (in block 208) and the ranking (in block 210).

In various example implementations, where a set of results includes a result which has been included in a previous set of results for the same user in the same session for an identical or similar query (where similarity may be computing using n-gram overlap) the result is promoted within the list of results by the ranking engine 130 (in block 210). In addition, or instead, where a set of results includes a result which has been included in a previous set of results for the same user in the same session but for a different query and where the user clicked on that result previously, the result is demoted within the list of results by the ranking engine 130 (in block 210).

In various example implementations, the Viewed URL Discount (VUD) may be used to discount (or demote) repeating results when performing ranking (in block 210). The VUD is the sum of the position discount values of the reoccurring URL and in an example the DCG (Discounted Cumulative Gain) discount [$1/\log_2(rank+1)$] may be used, where rank is the position of the URL on the SERP. In other examples, reciprocal rank or any other discount equation may alternatively be used. The VUD may be described with reference to an example scenario of a four query session in which URL U appears in the results list for the first, third and the fourth queries respectively at positions 1, 5, and 10 (and does not appear in the results for the second query).

For the first query in the session, the VUD(U)=0. This is always the case for all URLs in the first query of a session and as the methods herein rely on repeating results, the methods described herein do not apply to single query sessions (unless the methods are extended to include longer-term data, as described below with reference to FIGS. 3 and 4).

For the second query VUD(U)=$1/\log_2(2)$

For the third query VUD(U)=$1/\log_2(2)+0$

For the fourth query VUD(U)=$1/\log_2(2)+0+1/\log_2(5)$

In another example, the Clicked URL Discount (CUD) may be used instead of (or in addition to) the VUD. The CUD is similar to the VUD except that only clicked instances are considered.

As described above, the stored data is updated following a user action within the searching session (in block 206), where the user action may be a query, click, skip or miss. A query refers to the submission of a new or reformulated search query and a click refers to the selection of one of the results from a list of results presented to the user (where the selection may be performed by clicking with a mouse or using any other selection method).

A skip refers to a situation where a user sees one of the results (e.g. in the form of a URL) and chooses not to select (e.g. click) on it. A skip may be inferred or enabled via a UI that allows a user to explicitly suppress results. Where skips are inferred, the inference may, for example, be based on the fact that a result was displayed but the user did not select that result but did select a result lower down in the same list of results. For example, a where a user is presented with a list of 10 results (numbered 1-10 with 1 at the top and 10 at the bottom), if the user selects (e.g. clicks on) result 3, it may be inferred that the user has skipped results 1 and 2. In this example, skips are not inferred for results that appear lower in the list than the selected result (e.g. for results 4-10) as it is not known whether the user actually saw the lower results and these lower results may instead be categorized as misses. In another example, it may be assumed that a user has viewed a small number (e.g. 1 or 2) results below the lowest result that was clicked on and so referring back to the previous example, skips may be inferred for results 1 and 2 and results 4 and 5. In other implementations, however, the system may know which results were viewed by a user (e.g. through gaze tracking or awareness of which results were visible on screen) and so may infer skips for results which are positioned lower than the lowest selected result in the list of results.

Where a user repeatedly skips the same result, such results may be down-weighted (or demoted) in the ranking or may be removed from the ranking altogether. In some examples, skip likelihoods may be computed for every result that a user encounters on a list of results that is presented to them. In other examples, different weighting may be applied to skips dependent upon the position of the particular result. For example, results which are skipped at higher positions in a results list are more likely to be skipped when displayed subsequently and so may be demoted more than results skipped at lower positions in a results list.

As described above, a miss refers to a situation where a user does not see (or notice) a result. Misses may be inferred from click data, as described above, and in some examples may also use techniques which determine which results were viewed by a user (e.g. to distinguish between skips and misses). In some examples, misses may only be inferred for the top X results within the results list, where X may for example be set equal to 10 or 20. Where a user only views a first page of results (e.g. a page showing the first 10 results), misses may occur for the results on the next page (e.g. results 11-20). Where a user repeatedly misses the same result, the result may be promoted within the ranking (e.g. as they are likely to be relevant to the query but have not been given an opportunity to be clicked or skipped).

In some examples, the stored data (as stored in block 206) may relate to queries, lists of results, clicks, skips and misses. In other examples, however, the skip and/or miss data may not be stored and this information may instead be computed from the stored lists of results and click data. Other data may also be computed from the stored lists of results and click data such as the dwell time on any result (e.g. where the click data comprises time-stamped data).

Figure 3:
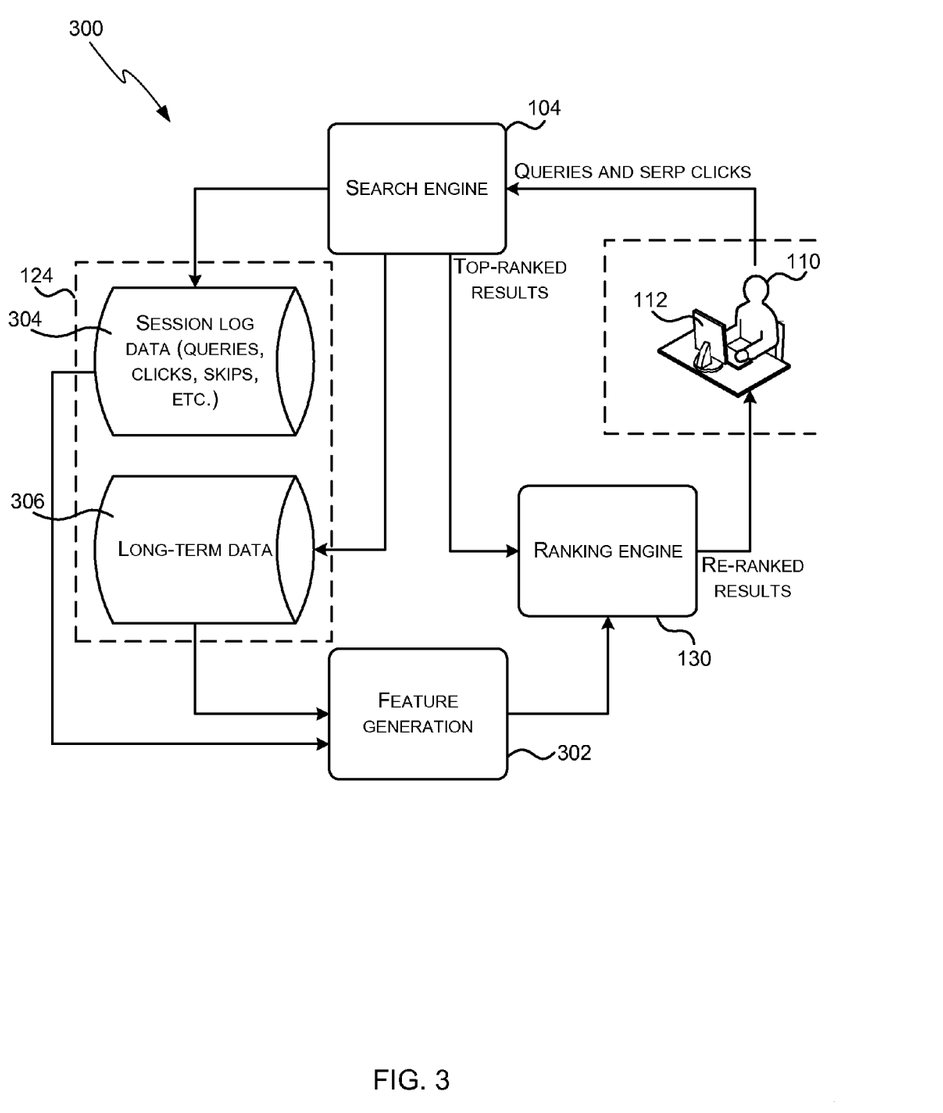
FIG. 3 is schematic diagram of another example information retrieval system.
Figure 4:
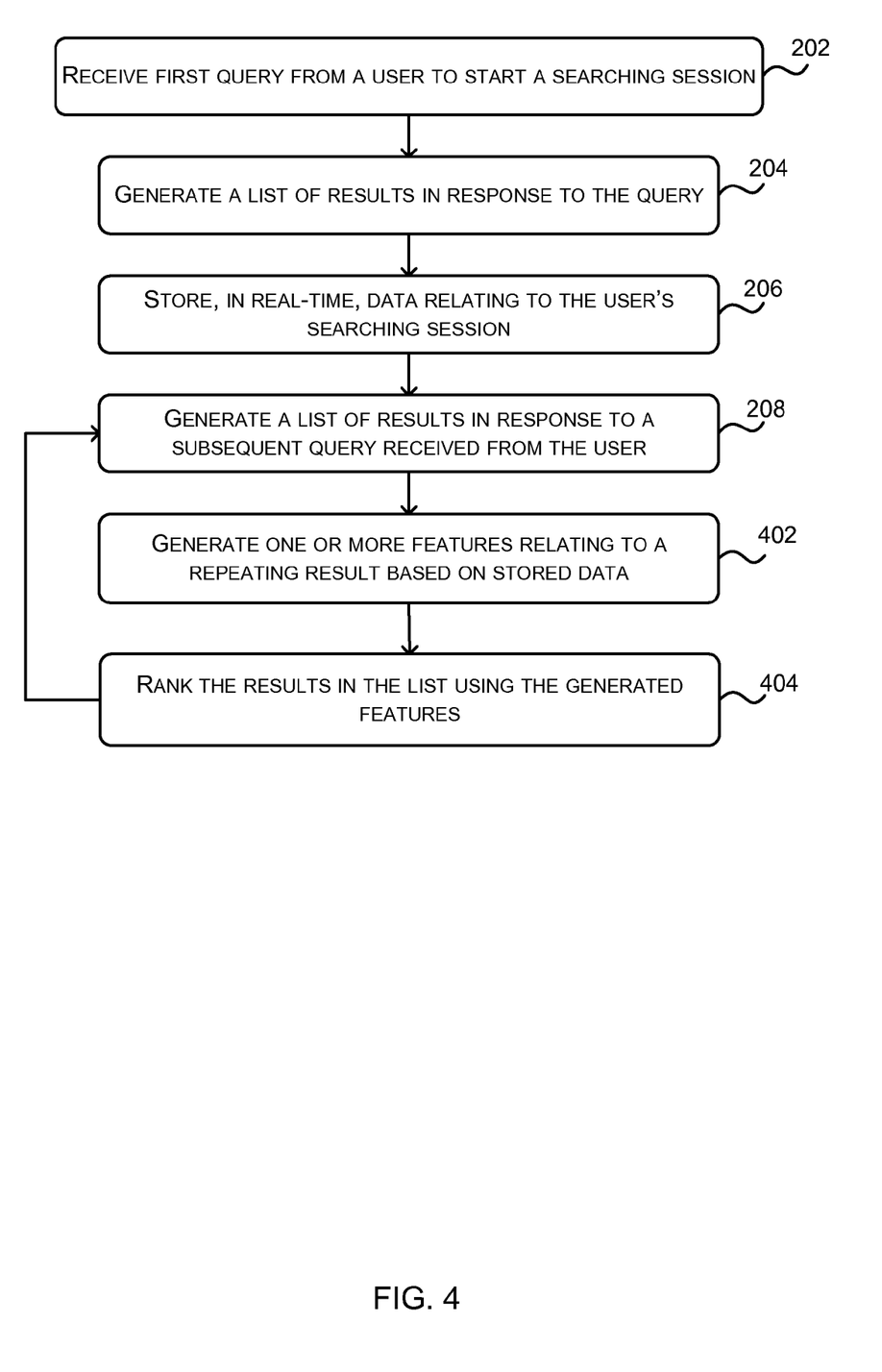
FIG. 4 is a flow diagram of another example method of operation of an information retrieval system, such as those shown in FIGS. 1, 3 and 5.

FIG. 3 is a schematic diagram of another example information retrieval system 300 which, like the system shown in FIG. 1, comprises a search engine 104, behavioral data store 124 and ranking engine 130. The index 108 and communications network 102 which connects a user's device 112 to the system 300 are not shown in FIG. 3; however these items may be present. The system 300 shown in FIG. 3 further comprises a feature generation element 302 which uses data from the behavioral data store 124 to generate features (block 402) which are input to and used by the ranking engine 130 to rank lists of results generated by the search engine 104 (block 404), as shown in FIG. 4 which is a flow diagram of another example method of operation of an information retrieval system. Various features which may be generated by the feature generation element 302 are described in detail below and these features may alternatively be referred to as parameters. An information retrieval system may use any one or more of the features described below and/or may use other features.

The behavioral data store 124 in FIG. 3 comprises two elements: session log data 304 and long-term data 306; however, in some examples, the behavioral data store 124 may only comprise session log data 304 or long-term data 306. The session log data 304 within the behavioral data store 124 was described above with reference to FIGS. 1 and 2 and as described above it records queries, lists of results and clicks for the current session and in some examples also records skips and/or misses. The session log data 304 is updated with each user action (e.g. each query, click, skip or miss). The long-term data 306 in contrast stores a longer history of data spanning multiple previous sessions and which reflects a user's long-term behavior. This long-term data 306 may, for example, comprise session log data for one or more previous sessions. In addition, or instead, the long-term data 306 may comprise a long-term profile of the user which may be generated offline and updated using session log data. The long-term profile may include one or more of: the frequency with which a query (or similar queries) has been issued by a user previously, the latency between historic clicks/skips/misses and the current query and trends or temporal features (e.g. the probability of a clock at each time of the day or on each day of the week, etc.).

As described above, the feature generation element 302 accesses data from the behavioral data store 124 (and in particular the session log data 304) and uses this to generate one or more features (in block 402) which may then be input to the ranking engine 130 and used in ranking a list of results (in block 404). These features may, for example, include one or more of the following:

Has this result been clicked in the same session?
Has this result been skipped in the same session?
Has this result been retrieved high in the search results in the same session?
How many times this result has been shown previously to the user and at what positions?
Is this result clicked or returned for the same query in the session?

In determining whether a result is a repeating result, the IR system may consider only those results which were displayed on a results page to a user, or the IR system may include more search results than those displayed to a user. For example, when identifying a list of results for a query, the search engine 104 may identify 1000 result, of which only 10 results are displayed to the user initially (e.g. where 10 results per page are displayed). A user may choose to view the next 10 results (e.g. by clicking on a 'next results' control in the GUI) and so may view more than 10 results (e.g. 20, 30, . . . results), but it is unlikely that the user will view all 1000 results. In such an example, determining whether a result has been retrieved high in the search results in the same session (the third bullet point above) may mean determining whether a result has been positioned sufficiently high on the ranked list of results that it has been displayed to a user (or is likely to have been displayed to a user).

In further examples, the feature generation element 302 may generate one or more of the following features (in block 402) and input these to the ranking engine 130 (for use in block 404):

Clicked Query Similarity (CQSIM): The similarity of the current query with the last query for which the URL is clicked. As described above, the similarity may be computed based on n-gram overlap and is always zero for results that have not been clicked when previously displayed to the user in the same session (i.e. that have not been clicked in past impressions) where only the session log data is being used in feature generation.

MaxClkQSim: The maximum similarity of the current query with any previous query in the session where the same result is clicked.

AvgClkQSim: The average similarity of the current query with previous queries in the session where the same result is clicked.

DWELL: The aggregated dwell time spent on the result (e.g. the time from when the user clicks on the result to when the user returns to the SERP) on previous clicks.

First Click In Session (FCIS): The query number (where the first query in session has the query number of one) of the impression for which the given result was clicked for the first time in the session.

Clicked URL discount (CUD): as described above.

Similarity with Previous Query (SPREV): The similarity computed based on word-overlap between the current query and the previous query in the session.

PrevClicked: Binary indicator set to one if the result has been previously clicked in the same session.

SKIPS: The number of impressions in which the result is shown but not clicked after its first click in the session.

SKIPS Ratio (SKIPSR): SKIPS divided by the number of impressions the result appears in after its first click.

Queries Since Last Click (QSLC): The current query number minus the query number of the impression for which the given result was clicked for the last time in the session.

Last Click In Session (LCIS): The query number of the impression for which the given result was clicked previously in the session.

Similarity Mean (SMEAN): The average similarity computed based on word-overlap between the current query and all other queries in the session.

PrevClicksCount or Clicked URL Count (CUC): The number of times a result is clicked in the same session.

PrevClicksCountMRR: This is similar to PrevClicksCount, but with a reciprocal rank discount determined according to the clicked positions.

QueryNo (or SEQ): The number of previous queries in the session+1

Similarity Max (SMAX): The maximum similarity computed based on word-overlap between the current query and all other queries in the session.

PrevShown or Viewed URL Count (VUC): The number of times a result is shown (i.e. included a results list) in the same session.

PrevShownMRR: Similar to PrevShown, but with a reciprocal rank discount determined according to the display positions.

URL Overlap with Previous Query (UPREV): The number of overlapping results between the current query and the previous query in the session.

URL Overlap Max (UMAX): The maximum number of overlapping results between the current query and any other previous query in the session.

URL Overlap Max (UMEAN): The average number of overlapping results between the current query and all previous queries in the session.

PN: The page number for the current query.

Position: Display rank of the result.

NumSessionClicks: Total number of clicks in the previous impressions of the session.

NumRepAbove: Number of repeated results in the current impression that are ranked at or above the current position.

RepeatQuery: This is a binary value, 1 if the query has appeared before in the session and 0 otherwise.

In an example implementation, the following set of features may be used: CQSIM, DWELL, FCIS, CUD, SPREV, PrevClicked, SKIPR, QSLC, LCIS, SMEAN, SKIPS, PrevClicksCount, QueryNo and SMAX and in some examples, the order of these features may be in decreasing estimated importance weight (i.e. such that DWELL and CQSIM have the highest estimated importance weight). In other example implementations, a different set of features may be used and in some examples, the set of features may be selected to capture different user behaviors.

An example of a supervised learning framework for promoting or demoting repeated results within a list of results using the ranking methods described above is now described. This example uses pairwise preference judgments and in particular uses Click>Skip-Previous (CSP) pairs to learn to predict preferences among pairs of results. In a CSP pair, the result at position i was skipped and the one at position i+1 was clicked. It will be appreciated that this shows just one example implementation and in other examples, the methods described herein may be implemented in other ways.

The method can be described with reference to the following two tables which show two chronological queries from a sampled user session. The first table relates to a query 'flash capture':

| Result | Clicked | Repeated | Dwell (s) |
|---|---|---|---|
| 1 www.dreamingsoft.com/flashcapture/index.htm | x | x | 0 |
| 2 download.cnet.com/Flash-Capture/3000-125 . . . | ✓ | x | 220 |
| 3 www.dreamingsoft.com | x | x | 0 |
| 4 download.cnet.com/1770-20__4-0.html?query . . . | x | x | 0 |
| 5 www.how-to-capture-streaming-media.com/c . . . | x | x | 0 |
| 6 www.flashvideocapture.com | x | x | 0 |
| 7 www.tucows.com/windows/internet/flashcap . . . | x | x | 0 |
| 8 www.flash-screen.com/flashsaver | x | x | 0 |
| 9 www.ehow.com/how__5106837__capture-flash-v . . . | x | x | 0 |
| 10 flash-capture.en.softonic.com | ✓ | x | 43 | and the second table relates to the query 'flash capture tool':

| Result | Clicked | Repeated | Dwell (s) |
|---|---|---|---|
| 1 download.cnet.com/1770-20__4-0.html?query . . . | x | ✓ | 0 |
| 2 www.dreamingsoft.com | x | ✓ | 0 |
| 3 www.swftools.com/tools-category.php?cat= . . . | x | x | 0 |
| 4 www.shareware guide.et/audio-multimedia/ . . . | x | x | 0 |
| 5 www.etrusoft.com/screen-capture-software . . . | x | x | 0 |
| 6 www.flashvideocapture.com | x | ✓ | 0 |
| 7 www.freedownloadscenter.com/free/572016 . . . | ✓ | x | 25 |
| 8 download.cnet.com/Flash-Capture/3000-125 . . . | x | ✓ | 0 |
| 9 www.freedownloadscenter.com/web__authoring . . . | ✓ | x | — |
| 10 www.swftools.com | x | x | 0 |

For the first query (flash capture), result pairs at positions (1,2) and (9,10) represent two instances of CSP where the result at the lower position was preferred over the one above. Similarly, for the second query, result pairs (6,7) and (8,9) are ranked by the search engine in reverse order of their inferred CSP preference. Among these pairs, the results at positions 7 and 9 for the second query (flash capture tool) are preferred over repeated results. Therefore, demoting those repeated results could potentially lead to a better ranked list for the second query.

In this example, the objective function may be taken to to be predicting CSP preferences that involve a repeated result. For a given session S with recorded impressions $I_1, I_2, \ldots, I_n$, the task is to reorder (if necessary) the repeated results in each impression $I_k$, according to the features extracted from previous impressions $(I_1, I_2, \ldots, I_{k-1})$. The clicks recorded on each impression $I_k$ may be used to extract the CSP preferences for that impression and used as the groundtruth data. In this example, both training and evaluation are restricted to those CSP pairs that include at least one repeated result and this example also ignores adjacent result pairs that are either both clicked, or both not clicked, as a user preference cannot be identified from the click signal. For example for the second query (flash capture tool) the following result pairs are considered: (6,7), (7,8), and (8,9). Among them, the inferred CSP preferences are in disagreement with the original order for pairs (6,7) and (8,9).

By focusing on pairwise CSP preferences in this example, CSP preferences are highly correlated with explicit preference judgments but can be mined from query logs in large numbers and pairwise preferences can be used directly for a full re-ranking. Starting from the top of a ranked list, any adjacent pair where their pairwise preference is in the opposite order of the default ranking is swapped. Conflicts due to overlapping preferences on results may be resolved by tie-breaking according to the original order. For instance, suppose that for a given impression, there are pairwise preferences in reverse order of the original ranking for pairs at positions (k−1, k), and (k, k+1). For such a conflict, the results in the first pair are swapped while the result at position k+1 remains at its original position.

Limiting the re-ranking changes to pairwise swaps as described above is a rather conservative approach and does not make drastic changes to the default ranking and so the risk of negatively affecting the relevance of the results is minimal. The evaluation process is simplified by using CSP pairwise preferences from measuring the quality of ranking with respect to clicks, to computing the accuracy of CSP preference classification which is easier to quantify.

As the aim in this example is to predict the correct preference between pairs of documents, this may be treated as a ranking problem over pairs instead of using a classification approach for training. The difference is the same as in standard machine learning applied to IR: predicting the relative relevance to other items is often more effective than predicting absolute relevance. Therefore, each pair is treated as a ranking and the label of the clicked item is 1 while the other item takes a label of 0.

In this example implementation, lambaMART may be used for the preference learning. LambdaMART is an application of the lambdaRank approach which gives a methodology for optimizing a variety of non-continuous ranking objective functions, to gradient-boosted decision trees. LambdaMART is described in a paper by Wu et al entitled 'Adapting boosting for information retrieval measures' (published in the Journal of Information Retrieval, 13:254-270, 2009). However, the methods described herein are not limited to any particular choice of learning algorithm.

In the methods described above, the ranking is based on user behavior data for a single user in a single search session. In a variation of any of the methods described above, the ranking (in block 210 or 404) may be performed using longer user history in addition to (or instead of) the data for the current session. For example, the analysis may be extended to consider multiple historic sessions from the same user in addition to the current session and to consider the SERP results that the same user has clicked on or skipped or missed previously over time. The time period may be defined (e.g. K days) or the user history which is considered when ranking may be the entire user history. In some examples, results may be weighted such that older data has less influence than data from more recent sessions.

In an example implementation, features may also be generated (by feature generation element 302) based on the long-term data 306 (in block 402) and then these features, in combination with those features generated based on the session log data 304 (also in block 402) may be used (by the ranking engine 130) in ranking the results generated by the search engine 104 (in block 404). Examples of such features include, but are not limited to:
  Has this result been clicked or skipped by the user in the past K days?
  Has this result been clicked under different queries by the user in the past?
  Has this result been retrieved high in the search results by the user in the past K days (where this may include more search results than those displayed on the result page to the user, as described above)?
where the value of K may, for example, be 14 or 28. Such an IR system may use two sets of features (as generated by the feature generation element 302), with one set relating to the current session (and generated from the session log data 304) and the other set relating to long-term data (and generated from the long-term data 306). Both sets of features may provide a separate improvement in the ranking of results and by combining the two the sum of the gains may be obtained.

Where longer term user data (i.e. data from the long-term data 306) is taken into consideration when ranking search results, temporal correlation may also be used, where this looks at previous user search activity on the same day of the week, time of day, or other correlated time period. For example:
  Has this result been clicked or skipped by the user on the same weekday or at the same time of the day previously?

In some examples, this temporal correlation has the effect of filtering the behavioral data which is used to rank lists of results generated by the search engine 104. In another variation, temporal correlation may be used to give higher weights to data for sessions which occurred at a similar time of day or on the same day of the week compared to sessions where there is no temporal correlation with the current session. Where temporal correlation is used, the aggregated longer term user data (from long-term data 306) may be considered and then the data may be divided into smaller time intervals (e.g. daily snapshots) in order to perform the temporal correlation. Depending on the type of temporal correlation used (e.g. time of day or day of week), the data may be divided in different ways.

In further examples, the feature generation element 302 may generate one or more of the following features (in block 402, in addition to or instead of one or more features based on the session log data 304) and input these to the ranking engine 130 (for use in block 404):
  PerUser_NumClicks: Number of SERP clicks on a result over the user's history.
  PerUser_TotalClicks: Total number of SERP clicks over the user's history.
  PerUser_PClick: Ratio of (PerUserQuery_NumClicks)/(PerUserQuery_TotalClicks)
  PerUserQuery_NumClicks: Number of SERP clicks on a result for a particular query over the user's history.
  PerUserQuery_TotalClicks: Total number of SERP clicks for a particular query over the user's history.
  PerUserQuery_PClick: Ratio of (PerUserQuery_NumClicks)/(PerUserQuery_TotalClicks)
These features (which may be referred to as likelihoods) may, in some examples, be conditioned based on the user, the query and other contextual variables such as the time of day or day of the week on which historic clicks have occurred.

Figure 5:
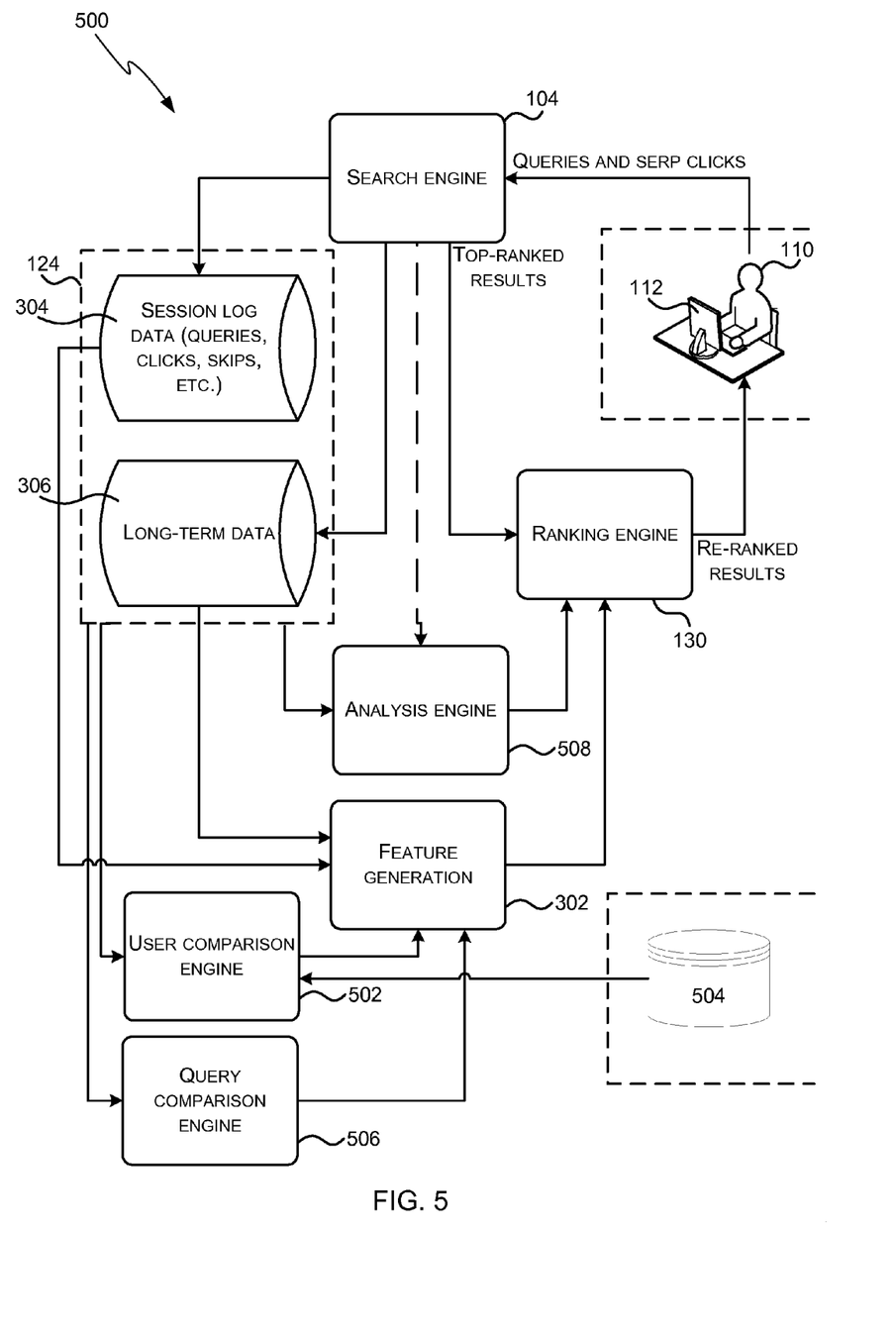
FIG. 5 is a schematic diagram of a further example information retrieval system.

In a further variation of any of the methods described above, the long-term histories from other users with high degrees of social or search similarity with the current user may also be used in ranking and this may be referred to as 'user backoff'. The long-term histories of similar users may be used in addition to or instead of using the particular user's long-term history and the long-term histories are used in combination with the data on the current session (e.g. session log data 304). Social similarities may, for example, be determined from a user's social network, where the social network may be defined based on friendships in a social networking system, an address book or other information from an email system (e.g. other user's who regularly communicate with the user), or any other means. Search similarity may, for example, be determined based on comparison of queries, SERP clicks or search interests over time, such that users with co-occurring queries or similar click patterns may be considered similar from a search perspective.

Where this variation is used, the behavioral data store 124 may comprise data from a plurality of users or there may be multiple data stores, each storing behavioral data for one or more users. Where data from multiple users is stored in the behavioral data store, the data for a particular user may be identified by a unique user ID. This user ID may, for example, be generated by the user's browser or may be the user's IP address. A user comparison engine 502 may be used to identify similar users and this comparison may be performed based on locally stored behavioral data (from data store 124) or an external data source 504 (such as a social networking system or email system), as shown in FIG. 5 which is a schematic diagram of a further example information retrieval system 500. The feature generation element 302 may then generate additional features based on the information received from the user comparison engine 502 and examples of such features may include one or more of:

Has this result been clicked/skipped (in the same session, or in the past K days) by the user's friends in her/his social network?

Has this result been clicked/skipped (in the same session, or in the past K days) by users that share similar queries, click patterns, topical search interests, etc. with the current user?

Has this result been clicked/skipped (in the same session, or in the past K days) for similar queries to the current query?

Where long-term histories from other similar users are used in ranking, the IR system 500 may still use the method shown in FIG. 4. In such an example, additional features are generated (in block 402) based on the other users' data and then these additional features are used (in block 404) in combination with features relating to the particular user performing the searching (e.g. current session data for that user). Data generated by the user comparison engine 502 determines what data is used by the feature generation element 302. It will also be appreciated that in such examples, data is stored in real-time for a plurality of users (in block 206) based on the actions of each user.

Where an information retrieval system enables more than one user to search together (for example, they may submit different but related queries using separate browsers but the IR system is able to link those queries), the session log data for the co-searching users may be combined and treated as if it was a single user's data in the methods described herein (e.g. such that the co-searching users are treated as a single user and a repeating result need only be shown to the group of co-searching users more than once). In a particular example, if a result is missed by a first user, it may be promoted by the ranking engine when the same result occurs in a results list for a second user in response to a query from that second user (which may be different to the query issued by the first user). In other examples, aspects of the session log data may be combined (e.g. whether a particular result was clicked on or not), but the methods may still require a single user to be shown the same result multiple times before ranking is performed.

In another variation of any of the methods described above, the long-term histories from a particular user for a particular query (e.g. PerUserQuery_NumClicks) may be augmented with historical data for similar searches by the same user and this may be referred to as 'query backoff'. The term 'similar searches' may include one or more of the following: textually similar searches, searches with similar intent and searches which produce similar or identical results. Use of query backoff may capture situations where a user may have the same intent with more than one search query but they may express it in slightly different ways when writing a search query. For example, a user interested in the 'WSDM (Web Search and Data Mining) 2012' program of events (where WSDM 2012 is a conference) may search for [wsdm 2012 program] and [wsdm 2012 schedule]—these queries have a similar intent. By identifying queries that partially match the current query, more data is available on which to base the long-term click or skip estimates (e.g. such as those features described above) and so improve the reliability of estimates. The IR system may comprise a query comparison engine 506 (as shown in FIG. 5) which is arranged to identify partially matching queries. Partially matching queries may be found in a number of ways including query normalization (e.g., lowercasing, trimming, alphanumeric sorting of term), string similarity (e.g., edit distance, term overlap), or even based on the fact that the two queries were issued by the same user in same search session or were issued sequentially within the same session by the same user.

In yet another variation of any of the methods described above, characteristics (or properties) of a particular search query and/or the user may be used to determine whether to apply ranking or may be used to determine parameters, such as weightings, which are used in the ranking process (by the ranking engine 130) and various examples are described in more detail below. The analysis or identification of these characteristics may be performed within an analysis engine 508 (as shown in FIG. 5), within the ranking engine 130 or within another element in the IR system and the ranking engine 130 may form only a part of the ranking infrastructure used by an IR system.

A first example characteristic which may be used is Query Type. This characteristic may distinguish between navigational queries and non-navigational (or informational) queries, where navigational queries are common queries (such as 'facebook', 'youtube' or 'bbc news') where most people will click on the same result within the results list (e.g. www.facebook.com). This characteristic may be used to stop or limit ranking of results generated for navigational queries. Other examples of Query Type may include: monitoring, refinding, floundering, common and rare.

The monitoring and refinding query types may be applied to queries that are commonly issued by a user and where the user interacts differently or more strongly with click/skip preferences. For example, a monitoring query may be used by a user to monitor the latest news for a particular subject without trying to reach a particular site and a refinding query may be a personal navigational query that displays stronger click preferences than on average because the user is purposely looking for the same result. Click entropy may be used to distinguish between these types of queries, with re-issued queries with high entropy being classed as monitoring queries and re-issued queries with low entropy being classed as refinding queries. This characterization may be used to stop or limit ranking of results generated for refinding queries.

A query may be categorized as a floundering query where a user issues multiple queries in quick succession with words in common (e.g. they may add or drop words between successive queries) and in particular where the user does not click on any results. This characterization may be used to stop or otherwise influence ranking of results.

Where common and rare query types are used, the ranking may be performed differently for rare queries compared to common queries (which may also be referred to as popular queries) and in an example, the characterization may be used to stop or limit ranking of results generated for popular queries.

A second example characteristic which may be used is Query Ambiguity. Query Ambiguity may be defined in terms of click entropy, where a query has a higher click entropy if there is a more uniform distribution of clicks across URLs in the results list compared to a query where the distribution of clicks is concentrated on a small number of results. This characteristic may be used to stop or limit the ranking of low click entropy queries. In other examples, Query Ambiguity may be defined in terms of another parameter.

A third example characteristic which may be used is the relatedness of a query in history, i.e. whether queries were issued close together in time or a long time apart. Click/skip/miss behavior on the same query issued spaced in time may be different on the two occasions, while there may be a larger correlation in behavior for less similar queries (and even queries with no word overlap) which are issued close together in time. Consequently, this characteristic may be used to weight data from the behavioral data store 124 in different ways. For example, where a query (e.g., "target venetian blinds") immediately follows another query in the same session ("target blinds"), this characteristic may be used to cause skips to carry a different weight than the same query issued long ago. Relatedness can be inferred based on word overlap, time features (within session or across session), and unweighted/weighted versions of: co-displayed results, co-retrieved results, snippet overlap, content overlap in retrieved/clicked result, anchor text similarity in retrieved/clicked results, query stream similarity in retrieved/clicked results.

Figure 6:
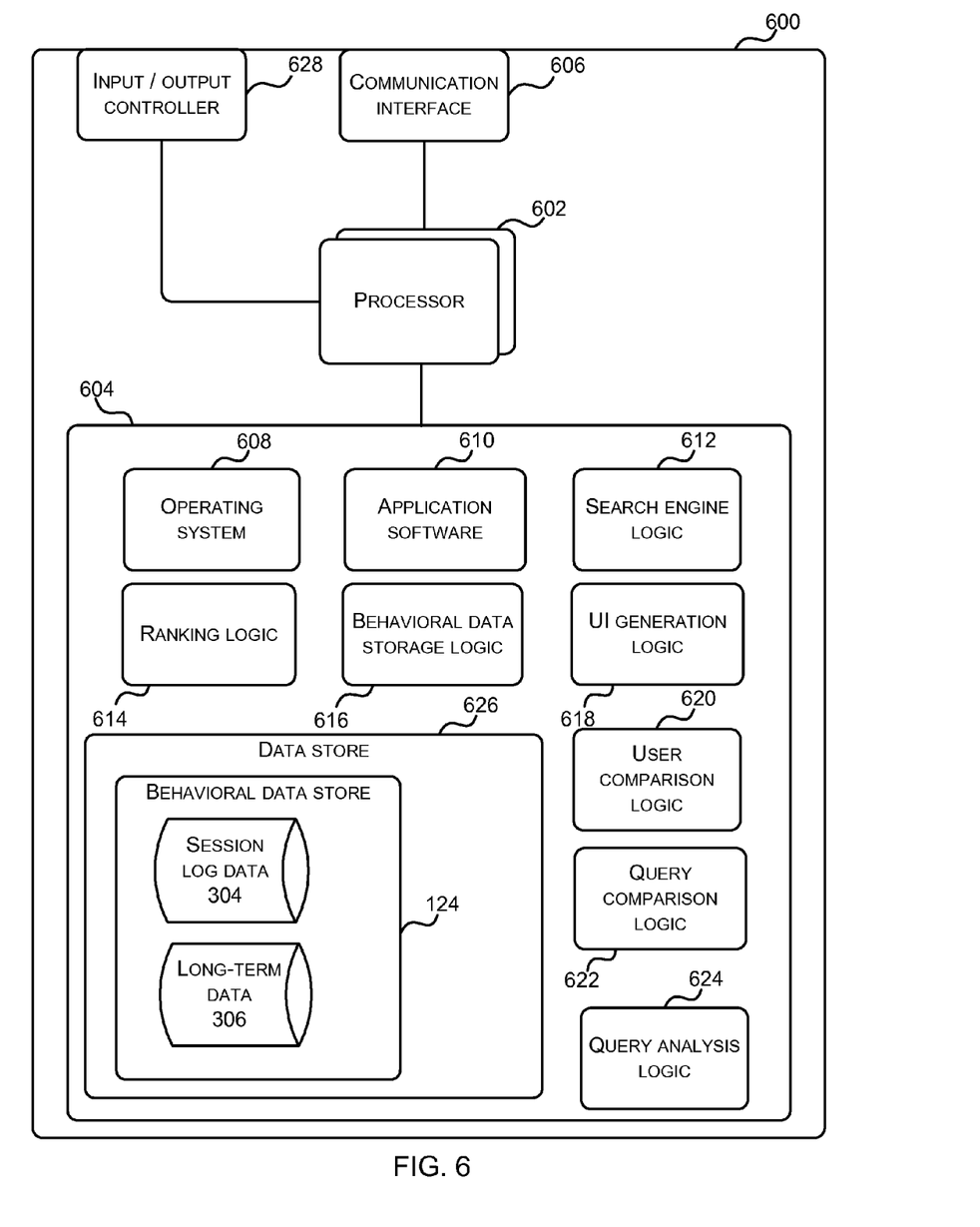
FIG. 6 illustrates an exemplary computing-based device in which embodiments of the methods described herein may be implemented.

FIG. 6 illustrates various components of an exemplary computing-based device 600 which may be implemented as any form of a computing and/or electronic device in which elements of the processing for an information retrieval system such as described above (e.g. IR system 100, 300, 500) may be implemented. In some examples, this computing-based device may be a search engine server and in other examples, where some of the functionality of the IR system is performed locally on the user's device, the computing-based device 600 may be the user's computing device.

Computing-based device 600 comprises one or more processors 602 which may be microprocessors, controllers or any other suitable type of processors for processing computer executable instructions to control the operation of the device in order to implement aspects of the IR system described above, for example, to perform one or more of: storage of user behavior data, feature generation, result ranking, user comparison, query comparison and query analysis. In some examples, for example where a system on a chip architecture is used, the processors 602 may include one or more fixed function blocks (also referred to as accelerators) which implement a part of the information retrieval method in hardware (rather than software or firmware).

Computer executable instructions and data storage may be provided using any computer-readable media that is accessible by computing based device 600. Computer-readable media may include, for example, computer storage media such as memory 604 and communications media. Computer storage media, such as memory 604, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 604) is shown within the computing-based device 600 it will be appreciated that the storage may be distributed or located remotely and accessed via a network or other communication link (e.g. using communication interface 606).

Platform software comprising an operating system 608 or any other suitable platform software may be provided at the computing-based device (e.g. in memory 604) to enable application software 610 to be executed on the device. The memory 604 may store executable instructions to implement one or more of the functions described above when executed on the processor 602. In an example, the executable instructions may comprise one or more of the following:

Search engine logic 612, arranged to generate a list of results (which may be ranked) in response to a user query when executed on processor 602;

Ranking logic 614, arranged to rank the list of results generated by the search engine based on any result which are included in more than one list of results generated by the search engine for a user when executed on processor 602;

Behavioral data storage logic 616, arranged to store and maintain logs of queries, clicks, skips and misses when executed on processor 602;

UI generation logic 618, arranged to generate the user interface 114 provided to the user when executed on processor 602;

User comparison logic 620, arranged to identify similar users when executed on processor 602;

Query comparison logic 622, arranged to compare queries when executed on processor 602; and Query analysis logic 624, arranged to analyze and categorize queries when executed on processor 602.

The memory 604 may also provide a data store 626. The data store 626 may be used to provide storage for data used by the processor 602 when performing the methods described above and in particular, the data store may comprise a behavioral data store 124. As described above, the behavioral data store 124 may comprise both session log data 304 and long-term data 306.

Where aspects of the functionality of the IR system are implemented locally to the user (i.e. on the user's computing device, such that computing-based device 600 is a user's computing device), the computing-based device 600 may also comprise an input/output controller 628 arranged to output display information to a display device which may be separate from or integral to the computing-based device 600. The display information may provide a graphical user interface. The input/output controller 628 may also be arranged to receive and process input from one or more devices, such as user input devices (e.g. a mouse, keyboard, camera, microphone or other sensor). In some examples the user input device may detect voice input, user gestures or other user actions and may provide a natural user interface. This user input may be used to generate search queries and to select results from results lists displayed to the user. In an embodiment the display device may also act as the user input device if it is a touch sensitive display device. The input/output controller 628 may also output data to devices other than the display device, e.g. a locally connected printing device.

The ranking process described above which uses data relating to a single user in a single session and/or long-term data for that same user may also be referred to as personalization of the search results. This is because the ranking is based on prior user searching and in many examples on prior user behavior.

In implementations where data from multiple users is used in the ranking, users may, in some examples, grant explicit permission for their data to be shared. In other examples, the data shared may be selected such that the data is non-sensitive, non-personal data and the data may be shared in an anonymous manner so that no personal or sensitive data is disclosed to other users.

Although the present examples are described and illustrated herein as being implemented in a web-based search system, the system described is provided as an example and not a limitation. As those skilled in the art will appreciate, the present examples are suitable for application in a variety of different types of information retrieval systems.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of ranking results generated by a search engine in response to a query, the method comprising:
   storing, in real-time, user behavior data relating to a searching session of a user, the user behavior data being stored in a behavioral data store; and
   ranking a set of results generated by the search engine in response to a query using the stored data and based on repetition of one or more results across multiple sets of results within one or more searching sessions of the user, the ranking being done using a machine-learning algorithm which is trained at least partly off-line using clicklogs, the set of results generated by the search engine comprising an ordered list of results, ranking the set of results comprising adjusting a position of a result in the ordered list based on stored data identifying that the result was also included in one or more previous lists of results generated by the search engine in response to an earlier query issued by the user.

2. A computer-implemented method according to claim 1, wherein the ranking of a set of results is based on repetition of one or more results across multiple sets of results within a single search session of the user.

3. A computer-implemented method according to claim 1, wherein adjusting the position of the result comprises promoting the result within the list based on stored data identifying that the result was also included in a previous set of results generated by the search engine in response to an earlier similar query issued by the user.

4. A computer-implemented method according to claim 1, wherein adjusting the position of the result comprises demoting the result within the list based on stored data identifying that the result was also included in a previous set of results generated by the search engine in response to an earlier different query issued by the user and based on stored data identifying that the user selected the result from the previous set of results.

5. A computer-implemented method according to claim 1, wherein the ranking is performed by a ranking engine and wherein the method further comprises:
   generating one or more features relating to repeating results across multiple sets of results within the searching session, based on the stored data; and
   inputting the features to the ranking engine.

6. A computer-implemented method according to claim 1, wherein the user behavior data relating to a searching session comprises lists of results generated by the search engine in response to queries issued by the user within the searching session and data relating to user clicks in relation to the lists of results.

7. A computer-implemented method according to claim 1, wherein the behavioral data store further comprises long-term data for the user, the long-term data relating to one or more previous searching sessions and wherein ranking the set of results is additionally based on the occurrence of the one or more repeating results in a set of results in a previous searching session.

8. A computer-implemented method according to claim 1, wherein ranking the set of results is additionally based on the occurrence of the one or more repeating results in a set of results for a similar user.

9. A computer-implemented method according to claim 1, wherein the ranking of the set of results is further based on a query type associated with the query.

10. An information retrieval system comprising:
   a search engine arranged to generate a list of results in response to a query received from a user in a searching session;
   a behavioral data store arranged to store, in real-time, user behavior data comprising lists of results and clicks for the searching session; and
   a ranking engine arranged to rank the results within the list based on stored data identifying that a result in the list of results was also included in another list of results generated by the search engine in response to a previous query from the user, the ranking engine using a machine-learning algorithm, the ranking engine being arranged to rank the results based on stored data identifying that a result in the list of results was also included in another list of results generated by the search engine in response to a previous query from the user in the same searching session.

11. An information retrieval system according to claim 10, wherein the behavioral data store is further arranged to store user behavior data for previous sessions and wherein the ranking engine is further arranged to rank the results within the list based on the stored data for previous searching sessions.

12. An information retrieval system according to claim 11, wherein the ranking engine is arranged to rank the results based on stored data identifying that a result in the list of results was also included in another list of results generated by the search engine in response to a query from the user in a previous searching session.

13. An information retrieval system according to claim 10, further comprising:
   a feature generation element arranged to generate one or more parameters based on the stored data and to input the parameters to the ranking engine, the parameters relating to repetition of results across multiple lists of results generated by the search engine in response to queries from the user,
   and wherein the ranking engine is arranged to rank the results based on the parameters received from the feature generation element.

14. An information retrieval system according to claim 10, wherein the ranking engine is arranged to promote results within the list where the result was included in a list of results generated by the search engine in response to a previous similar query from the user.

15. An information retrieval system according to claim 10, wherein the ranking engine is arranged to demote results within the list where the result was included in a list of results generated by the search engine in response to a previous different query from the user and based on stored data indicating that the user viewed the result in relation to that previous different query.

16. An information retrieval system according to claim 10, further comprising a user comparison engine arranged to identify similar users and wherein the ranking engine is further arranged to rank the results based on stored data identifying that a result in the list of results was also included in another list of results generated by the search engine in response to a query from a similar user.

17. An information retrieval system according to claim 10, further comprising a query comparison engine arranged to identify similar queries from other users and wherein the ranking engine is further arranged to rank the results based on stored data identifying that a result in the list of results was also included in another list of results generated by the search engine in response to a similar query from another user.

18. One or more computer storage media storing device-executable instructions that, when executed by a computing system, direct the computing system to perform steps comprising:
   generating a first list of results in response to a first search query received from a user in a searching session;
   storing, in real-time, user behavior data relating to the searching session, the user behavior data comprising lists of results generated, lists of results viewed by the user obtained by gaze tracking, and clicks associated with results;
   generating a second list of results in response to a subsequent search query received from the same user in the same searching session; and
   ranking the results in the second list based on any results in the second list which were also in the first list and based on stored user behavior data associated with any such results included in both the first list and the second list, the ranking being done using a machine-learning algorithm which is trained at least partly using click-logs.

* * * * *